United States Patent [19]

Rossi

[11] Patent Number: 4,605,631
[45] Date of Patent: Aug. 12, 1986

[54] ADVANCED PREPARATION OF CERAMIC POWDERS

[75] Inventor: Giulio A. Rossi, Shrewsbury, Mass.
[73] Assignee: Norton Company, Worcester, Mass.
[21] Appl. No.: 590,801
[22] Filed: Mar. 19, 1984
[51] Int. Cl.[4] .................. C04B 35/00; C04B 35/48
[52] U.S. Cl. ......................... 501/1; 501/103; 501/152; 423/266; 423/608
[58] Field of Search ............... 501/1, 103, 152; 423/608, 266

[56] References Cited

U.S. PATENT DOCUMENTS

| | | | |
|---|---|---|---|
| 3,312,631 | 4/1967 | Smith | 423/608 |
| 3,432,314 | 3/1969 | Mazdiyasni et al. | 501/103 |
| 3,514,252 | 5/1970 | Levy et al. | 423/608 |
| 4,328,296 | 5/1982 | Tanaka et al. | 501/103 |
| 4,365,011 | 12/1982 | Bernard et al. | 429/193 |
| 4,501,818 | 2/1985 | Rossi | 501/1 |

FOREIGN PATENT DOCUMENTS

| | | | |
|---|---|---|---|
| 0034513 | 8/1981 | European Pat. Off. | 423/608 |
| 58-135131 | 8/1983 | Japan | 423/608 |

OTHER PUBLICATIONS

Takagi et al, Ber. Dt. Keram. Ges., v 51, No. 8 (1974), pp. 234–235.

Primary Examiner—William R. Dixon, Jr.
Assistant Examiner—Steven Capella
Attorney, Agent, or Firm—Frank S. Chow

[57] ABSTRACT

Sub-micron sized powders of the ceramic metal oxides such as zirconia, alumina, titania, etc. are produced by precipitation upon mixing aqueous or aqueous/organic solutions of salts of the corresponding metal(s) with substantially 95% solutions of ammonia donors such as hexamethylenetetramine which are capable of reacting with water to give ammonia. The precipitates are treated with an alkali metal hydroxide to remove adsorbed organic matter, neutralized after completion of this treatment with acid, then washed with ammoniated water to remove any residual soluble salt and/or organic matter, dried, and calcined. The powders thus produced are readily sintered to high density ceramic bodies after conventional pressing or casting into a desired shape.

The process is especially suited to the production of zirconia powders, either pure or doped with conventional stabilizing oxides such as yttria, magnesia, or lime. In a typical example, a zirconia powder doped with about 5% by weight of yttria is prepared by adding a solution of zirconium oxychloride and yttrium chloride in water to a solution of hexamethylenetetramine in 95% ethanol. After alkali treatment, neutralization, and washing as described above, drying at 105° C., and calcining at 800° C. for two hours, the powder is pressed at 5000 psi (34 MPa) into a green body, which after one hour of sintering at 1600° C. has a density of 98.9% of theoretical.

12 Claims, 3 Drawing Figures

ADVANCED PREPARATION OF CERAMIC POWDERS

BACKGROUND OF THE INVENTION

1. Field of the Invention

This invention relates to the production of uniform sub-micron size ceramic powders suitable for sintering after pressing or casting to give solid ceramic bodies of near-theoretical density. The invention is particularly applicable to the production of such powders of pure zirconia and of zirconia doped with oxides such as yttria, other rare earth oxides, magnesia, lime, and combinations of any of these, which are known to stabilize the cubic crystal form of zirconia, but it is also applicable to production of sub-micron sized powders of alumina, silica, titania, and mixtures of these with a variety of other oxides.

2. Description of the Prior Art

The most common method for the production of sub-micron sized powders of the ceramic oxides is precipitation or co-precipitation of an oxide precursor from aqueous solution of a salt of the metal or metals to be used. Commonly, oxides, hydroxides, oxycarbonates, oxalates, etc., all usually with varying degrees of hydration, are precipitated at an appropriate pH. In all these cases, the precipitate normally has the form of a gel, which presents serious practical processing problems: First, filtration is very difficult because of clogging of the pores of the filter. Second, desalting of the gel by washing is very tedious as a result of the filtration problem; moreover, gradual peptization of the gel to sol results from the gradual drop in electrolyte concentration induced by washing and worsens the filtration problem still further. Third, oven drying of the purified gel often yields unsinterable powders.

Other established prior art method for the production of sinterable zirconia powders include high temperature oxidation of zirconium chloride with oxygen and/or water vapor, hydrolysis or thermal decomposition of zirconium alkoxides, and hydrothermal reaction of zirconium metal or its alloys. These methods, however, require complex and expensive equipment and/or expensive starting materials and thus find relatively little industrial use.

The recent U.S. Pat. No. 4,365,011 to Bernard et al. discloses an alternative precipitation method for the preparation of sinterable zirconia powders. According to the Bernard teaching, a solution of appropriate metal salt precursors is formed in alcohol rather than in water. A precipitate is formed by the action of aqueous ammonia on such a solution; the precipitate is washed with a hydrophilic solvent to eliminate most residual water, dried, and calcined. The drying step is preferably accomplished by azeotropic distillation with a third solvent such as benzene which is capable of displacing both water and the alcohol used. From this and other indications in the Bernard specification, I have concluded that the precipitate formed according to its teachings is a gel, and therefore is subject to all the processing difficulties for gels described above.

In my copending application Ser. No. 06/511,058, filed July 25, 1983, I described how sub-micron sinterable zirconia and other oxide powders could be synthesized in a non-aqueous solvent such as ethanol. A substantial advantage of that process is that no gel is formed, so that coarsening of the powder during drying and calcination is avoided. A disadvantage of that method is the requirement for large amounts of relatively expensive organic solvent.

SUMMARY OF THE INVENTION

I have now discovered that powders of high quality similar to that described in my abovesaid copending application can be prepared more economically in a partially aqueous medium. In particular, at least partially aqueous solutions of metal salts corresponding to the oxides desired in the final powders are mixed with hot organic solutions of materials such as hexamethylenetetramine which react with water to produce ammonia. Such materials are described herein as "ammonia donors". The organic solvents used for the dissolution of ammonia donors should be miscible with water. Suitable solvents include lower molecular weight alcohols such as ethanol or ketones such as acetone.

The precipitates formed by mixing the two solution types described above may be contaminated by adsorbed organic matter, probably formaldehyde, which can cause the precipitate to blacken and become unsinterable upon heating. If such a problem is observed, the organic matter is removed by treatment with hot alkali in either alcoholic or aqueous solution. The alkali is then neutralized with a convenient acid, e.g. a mineral acid, and the precipitate is freed from significant amounts of alkali ions by filtration or other conventional solid-liquid separation techniques followed by washing of the separated precipitate with aqueous ammonia. Such washing is critical in removing the last traces of salts and organic compounds.

The washed precipitate is then dried at a temperature slightly above the boiling point of water until constant weight is obtained. I have observed that no significant particle size growth takes place during this step. The dried powder is then calcined at a temperature high enough to expel all physically bound water and to change the precipitate if necessary into a stable crystal form for sintering, but not so high as to cause appreciable sintering or coarsening of particle size. For zirconia powders, this range corresponds to 460° C.–890° C. The powder as calcined is suitable for fabrication into ceramic bodies by standard techniques of pressing and firing. Because the calcined powder is often strongly agglomerated, higher density product may be achieved if the calcined powder is milled or otherwise deagglomerated by standard techniques before pressing.

DESCRIPTION OF THE PREFERRED EMBODIMENTS

Figure 1:
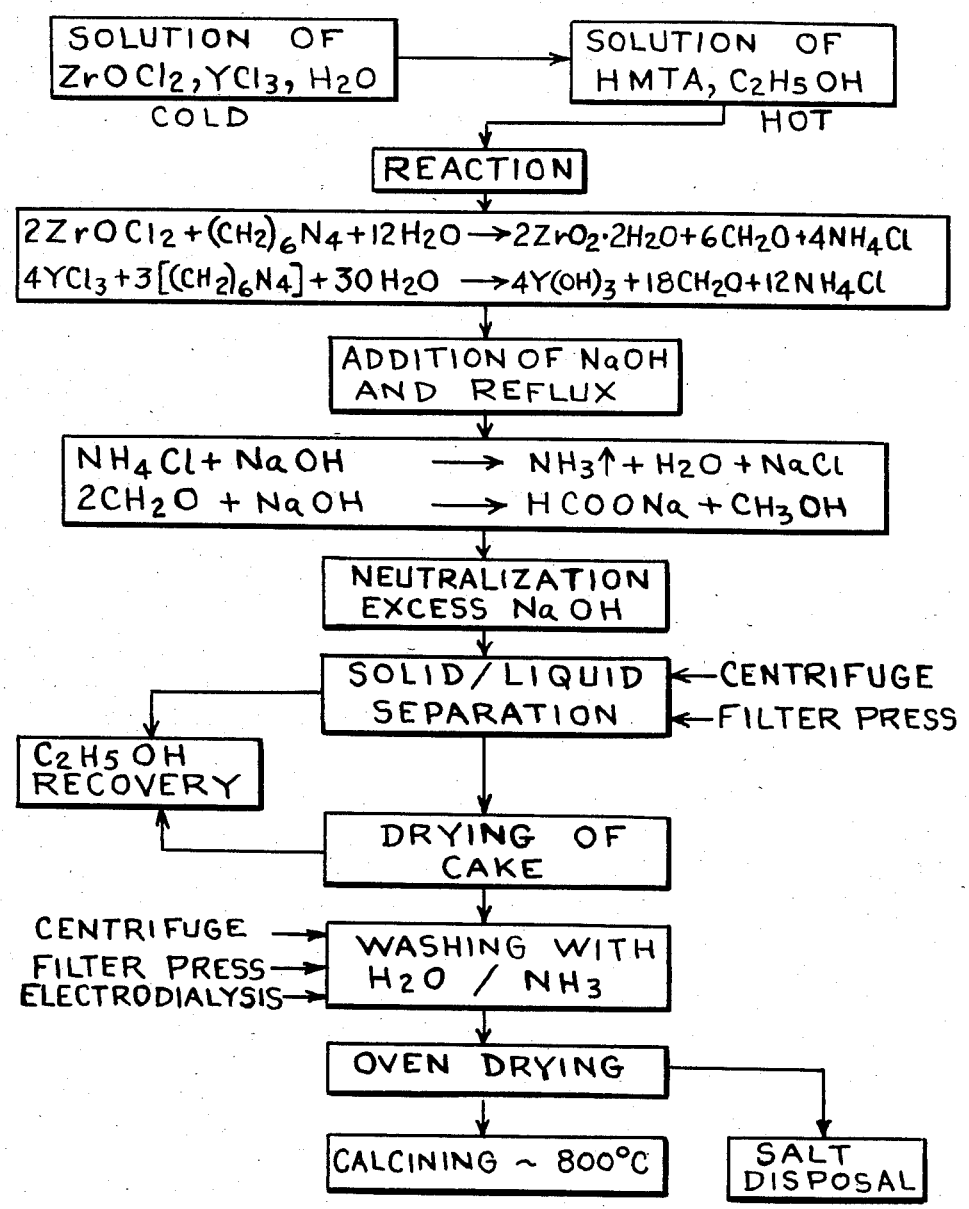
FIG. 1 is a process schematic chart of the general method of making powders according to this invention. The other figures are photomicrographs made with a scanning electron microscope of the powders prepared according to this invention or of the ceramic bodies made from these powders, as described further below.

Any convenient water soluble salt containing the cations of the metal constituents desired in the final powder may be employed for my invention. Preferably the concentration of metal should be high, so that highly soluble salts are best. When articles primarily of zirconia are to be prepared, it is normally advantageous, as generally known in the art, to add small amounts of yttrium, magnesium, calcium, or other known stabilizing oxides to promote the crystallization of zirconia in the cubic and/or tetragonal phase. This applies to the powders prepared by the methods of my invention as it does to those prepared by other means, For zirconia powders I have found that zirconium oxychloride solutions are particularly suitable, and when using yttria as the stabilizing oxide, as I generally prefer, yttrium chloride is a convenient source of that metal. The concentration of yttria is preferably in the range of 2.0-16.0% by weight.

It is also possible to use alcoholic or other organic solvents for the metal ion constituents of the powders to be prepared, but this is generally not preferred because of the higher cost of such a method.

Among ammonia donors, hexamethylenetetramine (hereinafter HMTA) is highly preferred. The ammonia donor should be dissolved in an organic solvent, and for HMTA 95% ethanol-water azeotrope is preferred. In order to achieve precipitation at a practical rate, it is necessary for a solution of HMTA in ethanol to be heated to at least 60° C., and a temperature of 70°-80° C. is preferred. When the latter temperature range is used, fine precipitate forms very rapidly upon mixing the room temperature metal salt solution with the hot HMTA solution. The precipitation reactions are exothermic, so that suitable cooling means should be supplied for the reaction vessel during the precipitation.

The precipitate normally contains ammonium salts as well as the desired metal hydroxides. When zirconium oxychloride and yttrium chloride metal salts are used, the precipitate will contain ammonium chloride. This may be removed by washing the powder with 95% ethanol. If other salts are formed, suitable organic solvents for them should be used. Any aqueous solution with a pH of 7 or less should be strictly avoided, because of the danger of gelling or dissolving the precipitated metal hydroxides. If recovery of the alcohol or other organic solvent is not economically required, washing at this stage may be eliminated altogether. In such a case, any ammonium salt will be removed later along with alkali after treatment with the latter.

When HMTA is used as the ammonia source, formaldehyde is also formed, and it is believed to be adsorbed tenaciously on the precipitated metal hydroxides. Such adsorption was inferred because attempts to dry and calcine precipitates washed only enough to remove ammonium chloride caused the precipitates to turn dark and become unsinterable. The presence of a potential problem of this sort may be detected by heating a small sample of the precipitate to about 400° C. and observing whether any discoloration occurs.

The most effective method found to avoid this problem was to treat the precipitate with boiling alkali solutions for an appreciable length of time. This treatment is believed to convert the formaldehyde to formate and methanol via the Cannizzaro reaction, but in any case it definitely clears the precipitated powders of their tendency to blacken upon heating. The treatment may be accomplished either with aqueous solution of strong alkali, after separating the precipitated powder from its supernatant liquid, or more conveniently by adding solid alkali hydroxide directly to the reaction vessel after precipitation and refluxing the slurry thereafter.

Primarily because of its relatively low cost, sodium hydroxide is my preferred alkali for this treatment, but other strongly ionizing hydroxides which are sufficiently soluble would be expected to work as well. The amount of hydroxide used must be sufficient to remove essentially all the adsorbed organic material from the surface of the powder.

Generally when the removal is accomplished by addition of solid hydroxide to the supernatant liquid, I have found that about 70% of the amount stoichiometrically required to react with all the formaldehyde and ammonium chloride theoretically produced during the precipitation is sufficient.

The chemical reactions which occur when using this process with a solution of zirconium oxychloride and yttrium chloride are believed to be:

$$(CH_2)_6N_4 + 6H_2O = 6CH_2O + 4NH_3 \quad (1)$$

$$ZrOCl_2 + 2NH_3 + 3H_2O = ZrO_2 \cdot 2H_2O + 2NH_4Cl \quad (2)$$

$$YCl_3 + 3NH_3 + 3H_2O = Y(OH)_3 + 3NH_4Cl \quad (3)$$

$$CH_2O + NaOH = HCOONa + CH_3OH \quad (4)$$

$$NH_4Cl + NaOH = NaCl + NH_3 + H_2O \quad (5)$$

It is believed that the first three of these reactions correspond to the precipitation process and that the latter two reactions proceed simultaneously when the precipitate is treated with alkali after precipitation. It is postulated that reaction (5) is slower than reaction (4) and that this is the reason for the sufficiency of less than the full stoichiometric amount of alkali to remove the formaldehyde or other organic contamination from the surface of the precipitated powders.

If the method of treating the powder with boiling aqueous alkali is used, there will generally be adequate alkali present and no difficulty in removing the contamination will arise.

After removing the organic contamination from the surface of the precipitate, any remaining alkali should preferably be neutralized with any convenient acid to a pH of 7.0±0.2. If the solution was not neutralized, it was found difficult to remove the alkali metal ion down to the low level desirable, i.e. less than 0.01% by weight. Sulfuric acid is preferred for the neutralization only because it is cheap, but hydrochloric, nitric, or other acids may be used as effectively. The neutralized slurry is then fed to a liquid/solid separation unit, such as a filter press or a perforated basket centrifuge, in order to recover the organic liquid. The cake, which contains salts and organic matter, is then thoroughly washed with a solution of aqueous ammonia to remove all soluble organic and inorganic substances which may be present in the cake. If only distilled water is used for washing, the cake will still contain adsorbed organic material and will turn dark upon calcination, giving an unsinterable powder.

After washing, the wet powder should then be dried in an oven or by other convenient means, preferably at a temperature of about 100°-105° C., to remove loosely bound water.

The dried powder still may contain substantial amounts of strongly physically bound water and therefore should not normally be used directly for sintering, as the water may be expelled during sintering and cause the body formed from the powder to crack. This is particularly likely for zirconia powders, which are known to undergo a recrystallization at about 460° C. This difficulty is overcome by calcining the powder at some temperature high enough to yield a stable crystal structure and water content, if any, for sintering, but not so high as to cause sintering or coarsening of particle size in the powder. For zirconia-yttria powders, 900° C.

was found sufficiently high to cause some undesirable coarsening, and a calcining temperature of 750°–800° C. is preferred.

The powder after calcining may be pressed directly by any standard hot or cold pressing technique, with use of conventional binders if desired, into ceramic greenware which is then fired according to conventional time and temperature programs for the metal oxide content of the body to be made. However, the powder after calcining was often found to be strongly agglomerated, and in such cases, higher density fired bodies could be achieved by first deagglomerating the powder by some standard technique such as ball milling.

Although the description has been given primarily in terms of the preparation of zirconia powders, it should be understood that it is equally applicable to the preparation of powders of silica, titania, alumina, and many other oxides and mixtures thereof.

The invention may be illustrated by the following examples:

EXAMPLE 1

An amount of 15.35 g of yttrium chloride hexahydrate supplied by Alfa Products was dissolved in 500 g of zirconium oxychloride solution (in water) with an equivalent concentration of 20% by weight zirconium oxide. (Such a zirconium oxychloride may be obtained from Magnesium Electron, Inc. in Flemington, NJ. This solution of zirconium and yttrium salts was designated solution A. Solution B was prepared by dissolving 125 g of HMTA in 1100 g of 95% ethanol. Solution B was heated to about 75° C. and stirred while solution A was poured into it, causing the formation of a precipitate. After a few minutes, 97.2 g of sodium hydroxide pellets were added in small portions to the reaction vessel and the slurry was boiled about one hour, then cooled. The cooled slurry was neutralized with 84.5 ml of concentrated reagent grade hydrochloric acid to produce a pH of 7. The neutralized slurry was poured into a perforated basket centrifuge and the solid there separated from the liquid. The solid cake was then washed, without intermediate drying, with ammonium hydroxide solution until the wash liquid failed to yield any silver chloride precipitate with saturated silver nitrate in concentrated nitric acid. The washed powder was then dried overnight in an oven at 105° C. and calcined at 750° C. for two hours in air.

The calcined powder was deagglomerated by mixing it with twice its weight of water and tumbling the resulting slurry with zirconia cylinder tumbling media in a polyethylene jar for 4 hours. The solid powder from the resulting slurry was separated from the cylinders and water and again dried in an oven at 105° C. The redried powder was mixed with 25% of its own weight of water as binder, then tumbled as the earlier slurry had been but for only two hours. The wet powder was separated from the zirconia cylinders, sieved through a 50 mesh nylon screen and pressed in a steel die at a pressure of 34 megapascals (MPa) to give greenware test tiles about 5 cm $\times$ 2.5 cm $\times$ 0.6 cm thick. The greenware tiles were dried overnight in a vacuum oven at a pressure of about 100 Pa and a temperature of about 150° C., then sintered in air to 1600° C. for one hour after being raised to that temperature from about 25° C. at a rate of 300° C. per hour. The average fired density of three test tiles was 6.03 megagrams per cubic meter ($Mg/m^3$) or 98.9% of the theoretical density.

Figure 2:

FIG. 2 shows a scanning electron microscope (SEM) photomicrograph of a polished and thermally etched (at 1600° C.) section of one of the tiles so made at a magnification of 5000$\times$. This shows a microstructure with most grains 1 micron or smaller in diameter. The general microstructure is very similar to that of ceramic bodies prepared from established high quality commercial powders of similar composition such as those sold by Toyo-Soda and Zircar Corp. Spectrographic analysis of these test tiles showed sodium, iron, and magnesium all less than 0.01% and aluminum less than 0.03%. Atomic absorption analysis for yttria indicated 4.89% by weight; the difference from the nominal composition of 5.4% by weight is believed to be due to losses in washing.

An X-ray diffraction pattern on the fired tiles showed only tetragonal zirconia crystal structure, as expected for this composition.

EXAMPLE 2

Figure 3:
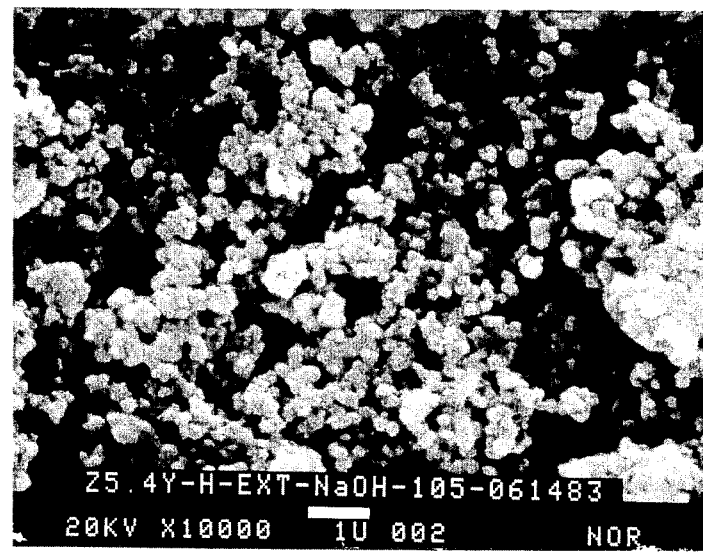

Another powder was made in a manner very similar to that of the beginning of Example 1, but was boiled in aqueous 10% by weight sodium hydroxide solution rather than adding sodium hydroxide pellets to the partially alcoholic slurry after the precipitation. An SEM photomicrograph of this powder is shown in FIG. 3. The apparent particle size is 0.1–0.2 micron, but a high surface area of 230 $m^2/gm$, measured by the standard BET method, indicates a much smaller ultimate crystallite size.

I claim:

1. A process for the preparation of sinterable metal oxide ceramic powders, comprising the steps of:
    (a) forming a first solution of an ammonia donor in a water-miscible organic liquid and a second solution of salts of all the metals whose oxides are present in said metal oxide ceramic powders, said second solution also containing sufficient water to produce by reaction with the ammonia donor in said first solution a sufficient amount of ammonia to precipitate at least part of the cations of the metal salts in said second solution when such ammonia is released into the said second solution;
    (b) mixing said first solution and said second solution while maintaining a temperature of at least 60° C. in the reaction vessel, so as to form a solid precipitate containing at least part of the ceramic metal content originally in said second solution;
    (c) treating said solid precipitate with alkali for a sufficient time to prevent discoloration of the precipitate upon subsequent heating to 400° C.;
    (d) neutralizing the alkali remaining after said treating of part (c) to produce a pH of 7.0$\pm$0.2 in the liquid phase in contact with said solid precipitate;
    (e) separating the solid phase remaining after part (d) from the bulk of the liquid phase present therewith after part (d);
    (f) washing the solid phase remaining after part (e) with sufficient aqueous ammonia to remove substantially all the soluble inorganic matter and the last traces of organic matter from said solid phase.
    (g) drying and calcining the solid phase remaining after part (f) by heating it for a sufficient time at a temperature sufficient to yield a stable crystal phase and degree of hydration if any for sintering but not so high as to cause appreciable sintering or coarsening of particle size in said solid phase.

2. A process according to claim 1, comprising the additional step of deagglomerating said calcined solid phase produced at the end of the process according to claim 1.

3. A process according to claim 2, wherein said second solution comprises a zirconium salt.

4. A process according to claim 3, wherein said second solution comprises an yttrium salt in an amount sufficient to yield an yttria concentration in the range of 2 to 16 percent by weight in the final solid powder produced by the process.

5. A process according to claim 1, wherein said second solution comprises a zirconium salt.

6. A process according to claim 5, wherein said second solution comprises an yttrium salt in an amount sufficient to yield an yttria concentration in the range of 2 to 16 percent by weight in the final solid powder produced by the process.

7. A process according to claim 6, wherein said first solution is formed with 95% ethanol as the solvent, said second solution is formed with water as the solvent, and said alkali is sodium hydroxide.

8. A process according to claim 5, wherein said first solution is formed with 95% ethanol as the solvent, said second solution is formed with water as the solvent, and said alkali is sodium hydroxide.

9. A process according to claim 4, wherein said first solution is formed with 95% ethanol as the solvent, said second solution is formed with water as the solvent, and said alkali is sodium hydroxide.

10. A process according to claim 3, wherein said first solution is formed with 95% ethanol as the solvent, said second solution is formed with water as the solvent, and said alkali is sodium hydroxide.

11. A process according to claim 2, wherein said first solution is formed with 95% ethanol as the solvent, said second solution is formed with water as the solvent, and said alkali is sodium hydroxide.

12. A process according to claim 1, wherein said first solution is formed with 95% ethanol as the solvent, said second solution is formed with water as the solvent, and said alkali is sodium hydroxide.

* * * * *